O. Krakoviez,

Ventilator.

No. 87,178. Patented Feb. 23, 1869.

Witnesses:
G. H. Mariner
J. Webster

Inventor:
Oswald Krakoviez
by J. B. Furcha
his Attorney

OSWALD KRAKOVIEZ, OF CHICAGO, ILLINOIS.

*Letters Patent No. 87,178, dated February 23, 1869.*

VENTILATOR.

The Schedule referred to in these Letters Patent and making part of the same.

*To all whom it may concern:*

Be it known that I, OSWALD KRAKOVIEZ, of the city of Chicago, in the county of Cook, and State of Illinois, have invented a new and useful "Room-Ventilator;" and I do hereby declare that the following is a full and exact description thereof, reference being had to the accompanying drawings, making part of this specification, in which—

Figure 1:
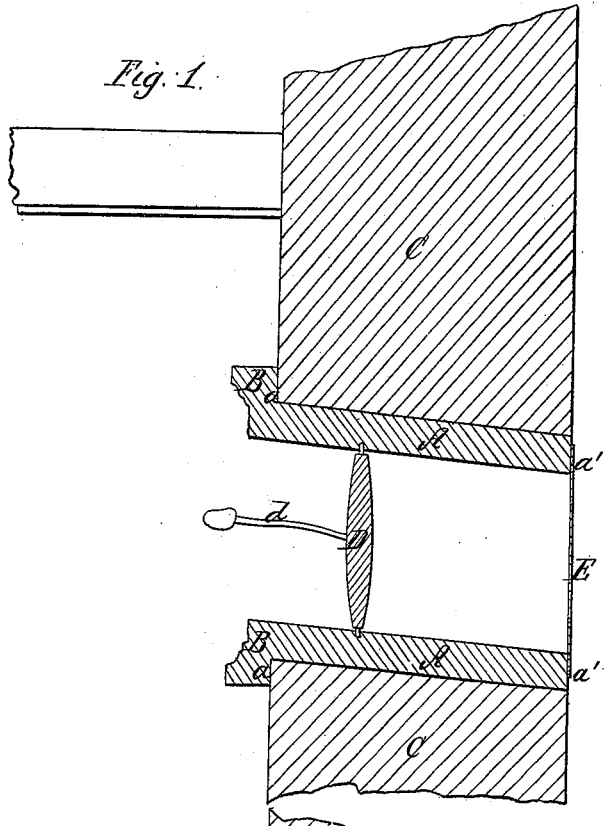

Figure 1 represents the section of the box vertically, and

Figure 2:
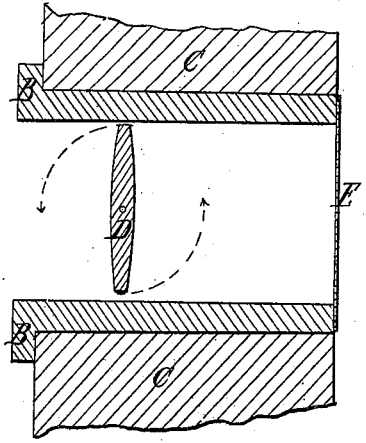

Figure 2, the section of the same horizontally, and

Figure 3:
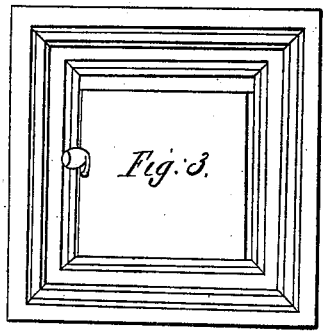

Figure 3 is the front view of the box and gate.

The object of my invention being to produce a convenient and cheap ventilator for rooms, its nature consists in a box opened or closed by a pivoting gate, and placed in the house-wall, near the ceiling, said box so arranged as to prevent insects, rain, or any extraneous matter, from entering into or through the box.

To enable others skilled in the art to which my invention appertains, to make and use said invention, I will proceed to describe its construction and operation.

A is the box, made of wood or metal, and of any suitable shape, provided with flange B at the end, placed inside of the wall C, and with a similar flange on its outside end if necessary or desirable, the flanges being plain or ornamental.

D is a pivoting gate, placed inside of the box A, and near its inside end, and provided with a suitable handle, $d$, or other convenient device, for the purpose of opening or closing the gate.

E is a wire net covering the outside opening of the box A, to prevent insects and other extraneous matter from getting inside of the box, and through it into the room.

The ends $a\ a'$ of the box are parallel to each other, or nearly so, but cut off slantingly to the direction of the box itself, in such a manner that when box A is placed into the wall C, and the ends $a\ a'$ are placed flush with the faces of the wall, the box has a slanting position from inside to the outside of the wall, in which position the water from rain or snow, entering the box through wire net E, is easily conveyed out of the box.

The box is intended to be made of any size, and be used for frame, brick, or any other buildings, and is to be placed in the rooms near or close to the ceiling. It makes a cheap, simple, and convenient room-ventilator for ordinary houses and workshops, and can be put in the walls at the time when buildings are constructed, or at any time afterward.

Gate D may be made shorter on one side, so as to leave, when closed, a small open space, to let out the gas escaping from gas-pipes or stoves.

Having thus described my invention,

What I claim as new, and desire to secure by Letters Patent, is—

The ventilator, consisting of the box A, having its body inclined, as represented, and provided with the netting E and pivoted valve D, all arranged to operate substantially as and for the purpose set forth.

OSWALD KRAKOVIEZ.

Witnesses:
  J. B. TURCHIN,
  G. A. MARINER.